United States Patent
Oeuvrard et al.

(10) Patent No.: US 9,193,098 B2
(45) Date of Patent: Nov. 24, 2015

(54) SKIN FOR A MOTOR VEHICLE TRIM ELEMENT, CORRESPONDING TRIM ELEMENT AND VEHICLE, METHOD FOR MANUFACTURING SUCH A SKIN

(75) Inventors: Jean Francois Oeuvrard, Pontoise (FR); Pierre Guerreiro, Eaubonne (FR)

(73) Assignee: Faurecia Interieur Industrie, Nanterre (FR)

( * ) Notice: Subject to any disclaimer, the term of this patent is extended or adjusted under 35 U.S.C. 154(b) by 698 days.

(21) Appl. No.: 13/282,070

(22) Filed: Oct. 26, 2011

(65) Prior Publication Data
US 2012/0288671 A1    Nov. 15, 2012

(30) Foreign Application Priority Data
Oct. 27, 2010   (FR) ..................... 10 58837

(51) Int. Cl.
| | |
|---|---|
| B32B 27/40 | (2006.01) |
| B29C 41/08 | (2006.01) |
| B29C 41/22 | (2006.01) |
| B60R 13/02 | (2006.01) |
| B29C 33/00 | (2006.01) |
| B29K 75/00 | (2006.01) |

(Continued)

(52) U.S. Cl.
CPC ............... B29C 41/08 (2013.01); B29C 41/22 (2013.01); B60R 13/02 (2013.01); *B29C 2033/0094* (2013.01); *B29K 2075/00* (2013.01); *B29K 2105/0058* (2013.01); *B29K 2995/0029* (2013.01); *B29L 2031/3005* (2013.01); *B29L 2031/3008* (2013.01); *B60Q 2500/10* (2013.01); *B60R 13/0256* (2013.01); *B60R 2013/0287* (2013.01); *Y10T 428/24331* (2015.01); *Y10T 428/31554* (2015.04)

(58) Field of Classification Search
CPC   B29C 41/08; B29C 41/22; B29C 2033/0094; B60R 13/02; B60R 13/0256; B60R 13/0287; B29K 2075/00; B29K 2105/0058; B29K 2995/0029; B29L 2031/3005; B29L 2031/3008; B60Q 2500/10; B32B 27/40; Y10T 428/24331

See application file for complete search history.

(56) References Cited

U.S. PATENT DOCUMENTS

| | | | |
|---|---|---|---|
| 2007/0246852 A1 | 10/2007 | DeBiasi | |
| 2009/0324941 A1* | 12/2009 | Benoit et al. | 428/339 |
| 2011/0157906 A1* | 6/2011 | Oeuvrard et al. | 362/488 |

FOREIGN PATENT DOCUMENTS

| | | |
|---|---|---|
| DE | 102008058192 | 5/2010 |
| EP | 1724085 | 11/2006 |

(Continued)

OTHER PUBLICATIONS

Machine Translation FR 2937928 A1. May 7, 2010.*

(Continued)

*Primary Examiner* — Maria Veronica Ewald
*Assistant Examiner* — Nancy Johnson
(74) *Attorney, Agent, or Firm* — Reising Ethington P.C.

(57) ABSTRACT

The invention relates to a skin for a motor vehicle trim element, intended to delimit an outer surface of the trim element and comprising at least one region with a substantially constant thickness. The skin comprises at least one first zone in which the skin comprises an outer layer, formed by a first translucent polyurethane material, and an inner layer, covered by the outer layer and formed by a second polyurethane material, different from the first polyurethane material, and at least one second zone, in which the skin comprises only said outer layer.

10 Claims, 2 Drawing Sheets

(51) Int. Cl.
*B29K 105/00* (2006.01)
*B29L 31/30* (2006.01)

(56) References Cited

FOREIGN PATENT DOCUMENTS

| | | |
|---|---|---|
| FR | 2824510 | 11/2002 |
| FR | 2935324 A1 * | 3/2010 |
| FR | 2937928 | 5/2010 |
| JP | 2010167918 | 8/2010 |
| WO | WO2010/098198 | 9/2010 |

OTHER PUBLICATIONS

Machine Translation to English of JP 2010-167918 A. Aug. 5, 2010. accessed Feb. 19, 2015.*
Search Report for French Application No. FR1058837, dated Jul. 28, 2011, 2 pages.
Written Opinion for French Application No. FR1058837, dated Oct. 27, 2010, 5 pages.

* cited by examiner

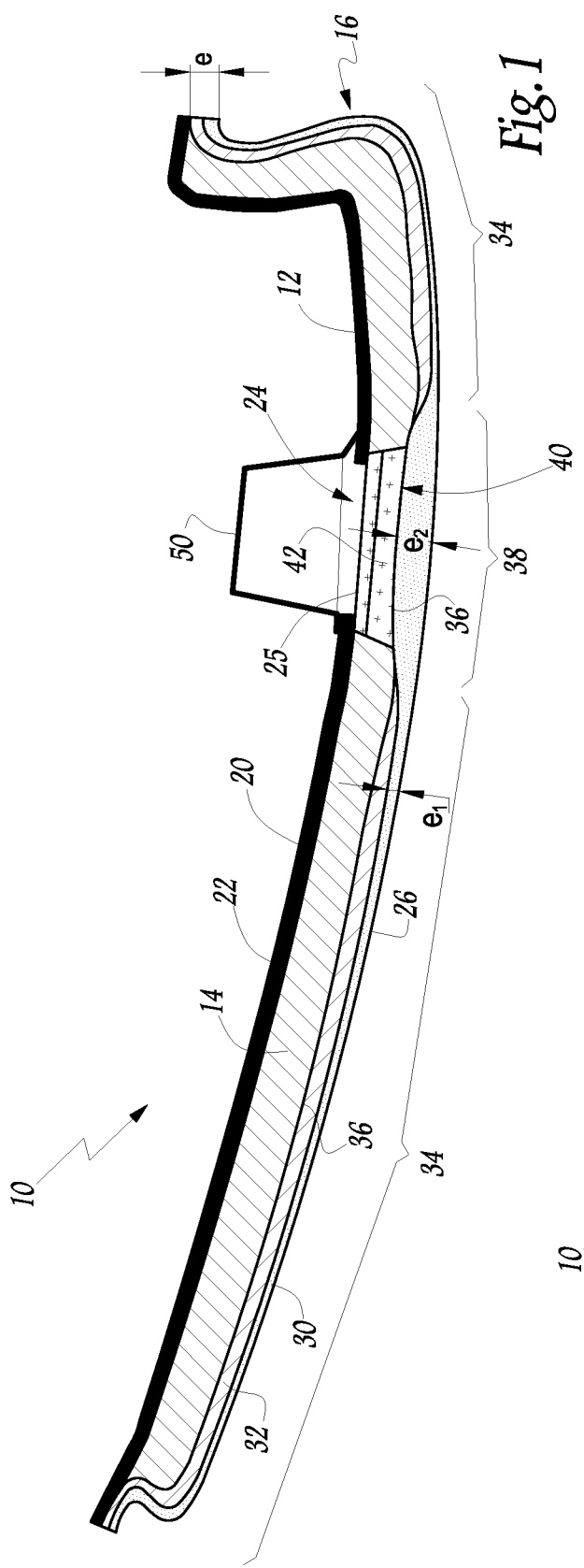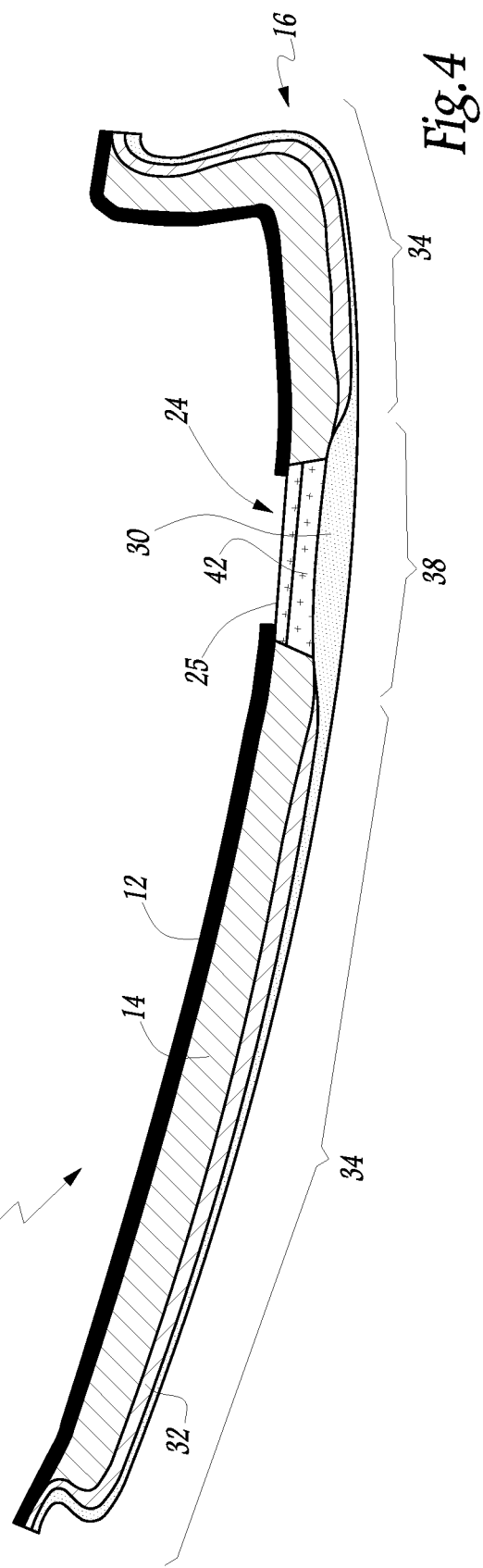

SKIN FOR A MOTOR VEHICLE TRIM ELEMENT, CORRESPONDING TRIM ELEMENT AND VEHICLE, METHOD FOR MANUFACTURING SUCH A SKIN

TECHNICAL FIELD

The present invention relates to a skin for a motor vehicle trim element, intended to delimit an outer surface of the trim element and comprising at least one region with a substantially constant thickness.

Such a skin is intended to give a pleasant visual appearance and feel to the trim element.

BACKGROUND AND SUMMARY OF THE INVENTION

As described in FR 2 937 928, it is known to provide trim elements equipped with a skin of the aforementioned type, making it possible to display icons directly on the skin, said icons indicating certain functions or states of the vehicle. Such trim elements are in particular used to trim the dashboard of the motor vehicle, situated under the windshield of the vehicle.

The zone forming the icon is generally arranged opposite a light source intended to backlight the icon.

One critical point is the diffusion of the light transmitted by the light source through the skin. The skin must in fact have good resistance over time, and in particular good resistance to abrasion and aging, to allow satisfactory diffusion of the light throughout the lifetime of the vehicle.

Aliphatic polyurethane has satisfactory performance in terms of light diffusion and resistance to abrasion and aging. However, aliphatic polyurethane is a very expensive material, which cannot be adapted to certain lines of motor vehicles.

One aim of the invention is to provide a skin of the aforementioned type, locally adapted to diffuse the light coming from a backlight source, offering good resistance to abrasion and aging, and having a reduced cost.

To that end, the invention relates to a skin of the aforementioned type, comprising, in said region, at least one first zone in which the skin comprises an outer layer, formed by a first translucent polyurethane material, and an inner layer, covered in all locations of the skin by the outer layer, and formed by a second polyurethane material, different from the first polyurethane material, and at least one second zone, in which the skin comprises only said outer layer.

The skin according to the invention can comprise one or more of the following features, considered alone or according to all technically possible combination(s):
  the first material is aliphatic polyurethane;
  the second material is aromatic polyurethane.

The invention also relates to a trim element comprising a skin as defined above, and a substantially rigid substrate, the skin covering said substrate.

The trim element according to the invention may comprise one or more of the following features, considered alone or according to all technically possible combinations:
  the substrate delimits at least one through opening, a light source being positioned opposite the opening, on one side of the substrate, the skin extending from the other side of the substrate, and the second zone of the skin is positioned opposite the opening;
  said trim element comprises a relatively flexible layer of foam inserted between the substrate and the skin, said foam layer delimiting at least one cavity between the opening of the substrate and the second zone of the skin positioned opposite said opening.

The invention also relates to a motor vehicle comprising a trim element as defined above.

Lastly, the invention also relates to a method for manufacturing a skin as defined above, characterized in that it comprises the following steps:
  providing a mold;
  spraying the first material on an inner surface of the mold, through a spraying head moving at a first speed in a first region of the mold, and at a second speed in at least one second region of the mold, the second speed being slower than the first speed, so as to form the outer layer; and
  applying the second material on the outer layer, with the exception of the part of the outer layer situated in the second region of the mold.

The method according to the invention may comprise one or more of the following features, considered alone or according to all technically possible combinations:
  the second material is sprayed;
  when the second material is sprayed, a removable protective mask is applied on the part of the outer layer situated in the second region of the mold.

BRIEF DESCRIPTION OF THE DRAWINGS

Other features and advantages of the invention will appear upon reading the following description, provided solely as an example and done in reference to the appended drawings, in which:

FIG. 1 is a diagrammatic cross-sectional view of a trim element according to the invention;

FIG. 4 is a diagrammatic cross-sectional view of a third step of manufacturing the trim element of FIG. 1.

DESCRIPTION OF THE ILLUSTRATED EMBODIMENT(S)

Figure 2:
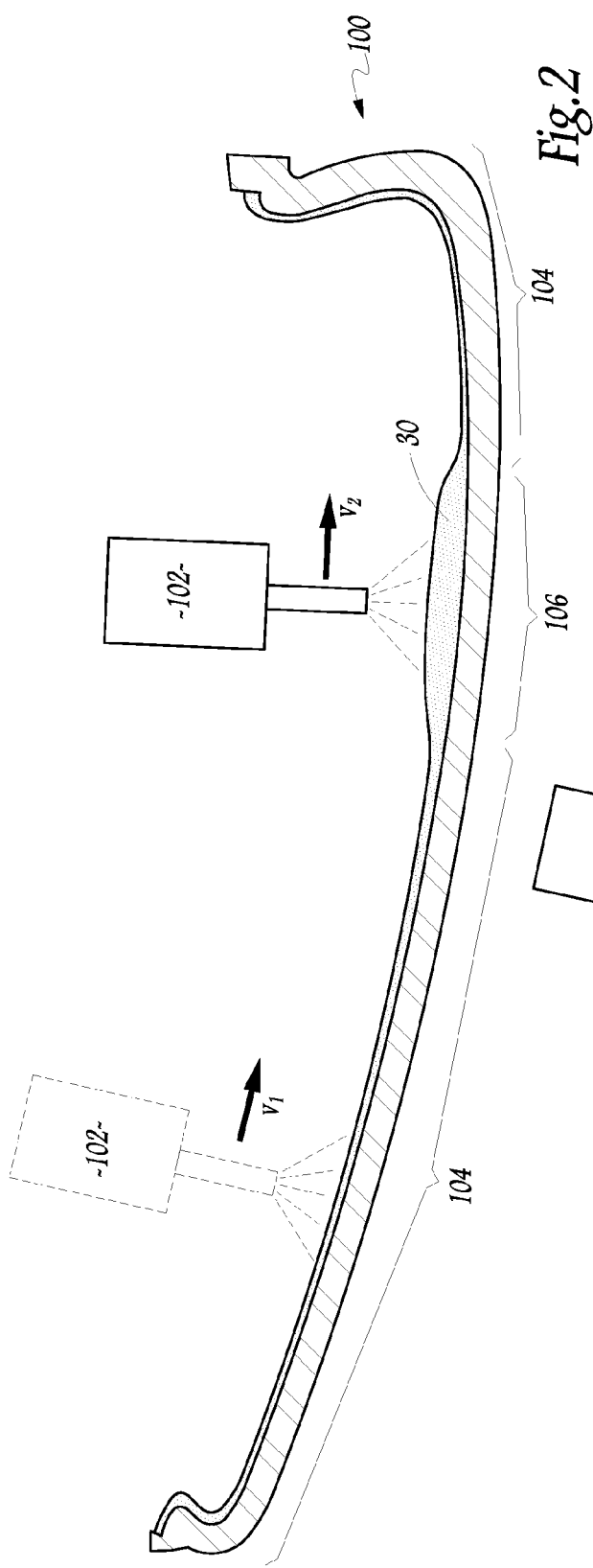
FIG. 2 is a diagrammatic cross-sectional view of a first step of a method for manufacturing the trim element of FIG. 1.

In the description, "outer" refers to what is visible from the passenger cab of the vehicle and "inner" refers to what is not visible. The terms "upper" and "lower" are defined relative to a direction going from the wall of the passenger cab toward the inside of the passenger cab.

The trim element 10, shown in FIG. 1, comprises a substrate or support element 12, substantially rigid, covered with a foam layer 14 and a skin 16, both substantially flexible.

The substrate 12 is for example made from polypropylene and makes it possible to fasten the trim element on the structure of the motor vehicle. It has a lower surface 20, intended to be oriented toward the structure of the motor vehicle, and an upper surface 22, opposite the lower surface 20, intended to be oriented toward the inside of the passenger cab of the motor vehicle, and against which the foam layer 14 extends.

Alternatively, the trim element 10 does not comprise a foam layer 14, and the skin 16 is then directly pressed against the upper surface 22 of the substrate 12.

The substrate 12 delimits a through opening 24 for backlighting a zone of the skin 16, the opening 24 emerging in the lower surface 20 and the upper surface 22.

The opening 24 is closed by a translucent or transparent rigid plate 25. "Closed" means that the plate 25 extends opposite the opening 24, the edges of the plate 25 being in contact with the upper surface 22 of the substrate 12. The plate 25 is for example made from polycarbonate. Because it is translucent, light can pass through the plate 25. In the case of a transparent plate 25, the light is not modified or diffused in the thickness of the plate 25.

Alternatively, the plate 25 is replaced by a translucent or transparent semi-rigid membrane.

The skin 16 delimits an outer surface 26 of the trim element 10. In the illustrated example, it has a substantially constant thickness e. The thickness e is for example comprised between 1 and 2 mm. The thickness e being substantially constant, the skin 16 has a homogenous resistance over its entire surface, and in particular has a substantially homogenous feel. Alternatively, at least one region of the skin 16 has a substantially constant thickness, in particular in and around the backlit zone of the skin 16.

The skin 16 comprises an outer layer 30, visible from inside the passenger cab of the vehicle, and an inner layer 32, covered by the outer layer 30 and in contact with the layer of foam 14 and/or the substrate 12. In other words, the inner layer 32 is inserted between the substrate 12 and the outer layer 30.

The skin 16 comprises a first zone 34 in which the skin 16 is formed by the outer layer 30 and the inner layer 32. In the first zone 34, the inner surface 36 of the skin 16 is thus delimited by the inner layer 32.

The skin 16 also comprises a second zone 38, distinct from the first zone 34, in which the skin 16 is formed only by the outer layer 30. In other words, the second zone 38 of the skin 16 does not comprise a portion of the inner layer 32. In the second zone 38, the inner surface 36 of the skin 16 is thus delimited by the outer layer 30.

The second zone 38 is positioned opposite the opening 24 and forms the backlit zone of the skin 16.

The outer layer 30 is formed in a first translucent polyurethane material, having good resistance to abrasion and aging, and allowing light passing through the outer layer 30 to diffuse partially in the thickness of the layer 30. The first material is for example aliphatic polyurethane.

The outer layer 30 has, in the first zone 34, a first thickness e1 strictly smaller than the thickness e of the skin 16. The first thickness e1 is for example comprised between 0.1 and 0.4 mm. The outer layer 30 has, in the second zone 38, a second thickness e2 equal to the thickness e of the skin 16.

The inner layer 32 is formed in a second polyurethane material, different from the first polyurethane material. This second material is for example aromatic polyurethane, which is inexpensive.

The inner layer 32 locally has a thickness equal to the difference between the local thickness e1 of the outer layer 30 and the thickness e of the skin 16.

The foam layer 14 is inserted between the substrate 12 and the skin 16. It is for example polyurethane-based.

The layer of foam 14 delimits a cavity 40 between the opening 24 of the substrate 12 and the second zone 38 of the skin 16. Said cavity 40 is filled with a translucent or transparent gel 42 allowing the passage of light. In the case where the gel 42 is transparent, the light is not diffused in the gel 42. The gel 42 is for example a polyurethane gel.

The trim element 10 also comprises a light source 50 arranged opposite the opening 24, on the side of the substrate 12 opposite the side of the substrate where the skin 16 extends. The light source 50 is positioned against the inner surface 20 of the substrate 12. It is adapted to light the second zone 38 of the skin 16.

This light source 50 is for example a lamp house comprising a light-emitting diode arranged to emit light toward the second zone 38 of the skin 16. Such a lamp house is known in itself and will not be described in further detail.

Owing to the invention, the cost of the skin of the trim element is minimized, while allowing a good diffusion of the light emitted by the light sources through the skin at certain zones. In fact, the first material is used in small quantities, to form the outer layer and the zone where it is necessary to have good light diffusion properties, i.e. in the backlit zone of the skin, and resistance, while also imparting a satisfactory appearance to the trim element. The rest of the skin is formed by an inexpensive material whereof the properties and appearance do not need to be optimized, since it is not visible from the outside of the trim element and does not serve to transmit light.

Furthermore, the skin has a sufficient thickness to have a satisfactory mechanical strength, and that thickness being substantially constant, the feel of the skin is substantially homogenous.

The method for manufacturing the trim element 10 will now be described, in light of FIGS. 1 to 4.

In a first step, shown in FIG. 2, the outer layer 30 of the skin 16 is formed by spraying the first material on the inner surface of the mold 100. The first material is sprayed, in semi-liquid form, by a first spraying head 102 moving at a first speed v1 in a first region 104 of the mold 100, and at a second speed v2 in a second region 106 of the mold 100. The second speed v2 is lower than the first speed v1, so that the outer layer 30 is locally thicker in the second region 106 of the mold 100 than in the first region 104, so as to form the zone 38 of the skin 16.

It will be noted that, for understanding the invention, the first spraying head 102 has been shown twice in FIG. 2, once in broken lines, when the head 102 is in the first region 104 of the mold 100 and moves at the first speed v1, and a second time in solid lines, when the head 102 is in the second region 106 and moves at the second speed v2.

Figure 3:
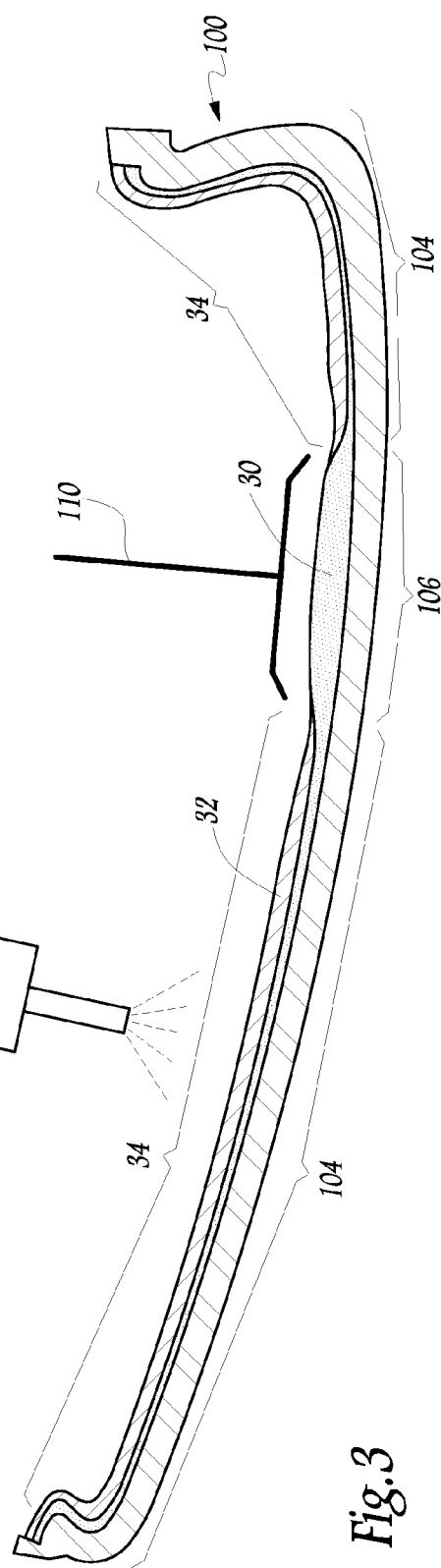
FIG. 3 is a diagrammatic cross-sectional view of a second step of manufacturing the trim element of FIG. 1.

In a second step, shown in FIG. 3, the second material is applied, after hardening of the first material, on an inner surface of the outer layer 30, still in the mold 100, so as to form the inner layer 32. Preferably, the second material is sprayed, in a semi-liquid form, on the outer layer 30 using a second spraying head 108. The second spraying head 108 is preferably distinct from the first spraying head 102.

The second material is thus applied on all of the inner surface of the outer layer 30, with the exception of the part of the outer layer 30 situated in the second region 106 of the mold 100. Preferably, a removable protective mask 110 is applied on the part of the outer layer 30 situated in the second region 106, so as to avoid spraying the second material on said part.

Once the second material is applied on the lower surface of the outer layer 30, and hardened, one obtains the skin 16. The part of the skin 16 situated in the first region 104 of the mold 100 forms the first zone 34 of the skin 16, and the part of the skin 16 situated in the second region 106 of the mold 100 forms the second zone 38 of the skin 16.

Once the skin 16 is formed, it is released from the mold 100. Then, in a third step of the manufacturing method, shown in FIG. 4, the skin 16 is placed opposite a substrate 12 delimiting an opening 24 closed by a translucent or transparent plate 25, so that the second zone 38 is opposite the opening 24. Translucent or transparent gel 42 is then injected between the plate 25 and the second zone 38, or a gel cushion 42 is positioned between the plate 25 and the second zone 38. Then foam 14 is injected into the space left empty between the substrate 12 and the skin 16.

Lastly, in a fourth step, a light source 50 is positioned against the lower surface 20 of the substrate 12, opposite the opening 24, so that one obtains the trim element 10 shown in FIG. 1.

Owing to the method according to the invention, the manufacture of the trim element 10 is done particularly easily and quickly, at a reduced cost. Thus, the trim element can be used on all lines of vehicles.

It is thus easy to see the advantages of the proposed solution, both in terms of production cost and the quality and resistance of the obtained product.

The invention claimed is:

1. A skin for a motor vehicle trim element, having an outer surface intended to constitute an outer surface of the trim element, and an inner surface opposite the outer surface,
   wherein the skin comprises an outer layer defining said outer surface, and an inner layer defining a part of said inner surface,
   wherein said outer layer is formed by a first translucent polyurethane material, and said inner layer is formed by a second polyurethane material different from the first polyurethane material,
   wherein the inner layer has a surface, opposite the inner surface, which is entirely covered by the outer layer, and
   wherein the skin comprises at least one region with a substantially constant thickness, said region comprising:
   at least one first zone in which the skin comprises both said outer and inner layers, and
   at least one second zone in which the skin comprises only said outer layer.

2. The skin according to claim 1, wherein the first material is aliphatic polyurethane.

3. The skin according to claim 1, wherein the second material is aromatic polyurethane.

4. A trim element comprising a skin according to claim 1, and a substantially rigid substrate, the skin covering said substrate.

5. The trim element according to claim 4, wherein the substrate delimits at least one through opening, a light source being positioned opposite the opening on one side of the substrate, the skin extending on the other side of the substrate, the second zone of the skin being positioned opposite the opening.

6. The trim element according to claim 5, comprising a foam layer which is relatively flexible and is inserted between the substrate and the skin, said foam layer delimiting at least one cavity between the opening of the substrate and the second zone of the skin positioned opposite said opening, the inner layer being entirely inserted between the outer layer and the foam layer.

7. A motor vehicle comprising a trim element according to claim 4.

8. A method for manufacturing a skin according to claim 1, comprising the following steps:
   providing a mold;
   spraying the first material on an inner surface of the mold, through a spraying head moving at a first speed in a first region of the mold, and at a second speed in at least one second region of the mold, the second speed being slower than the first speed, so as to form the outer layer; and
   applying the second material on the outer layer, with the exception of the part of the outer layer situated in the second region of the mold.

9. The manufacturing method according to claim 8, wherein the second material is sprayed.

10. The manufacturing method according to claim 9, wherein, when the second material is sprayed, a removable protective mask is applied on the part of the outer layer situated in the second region of the mold.

* * * * *